Figures 1A, 2:
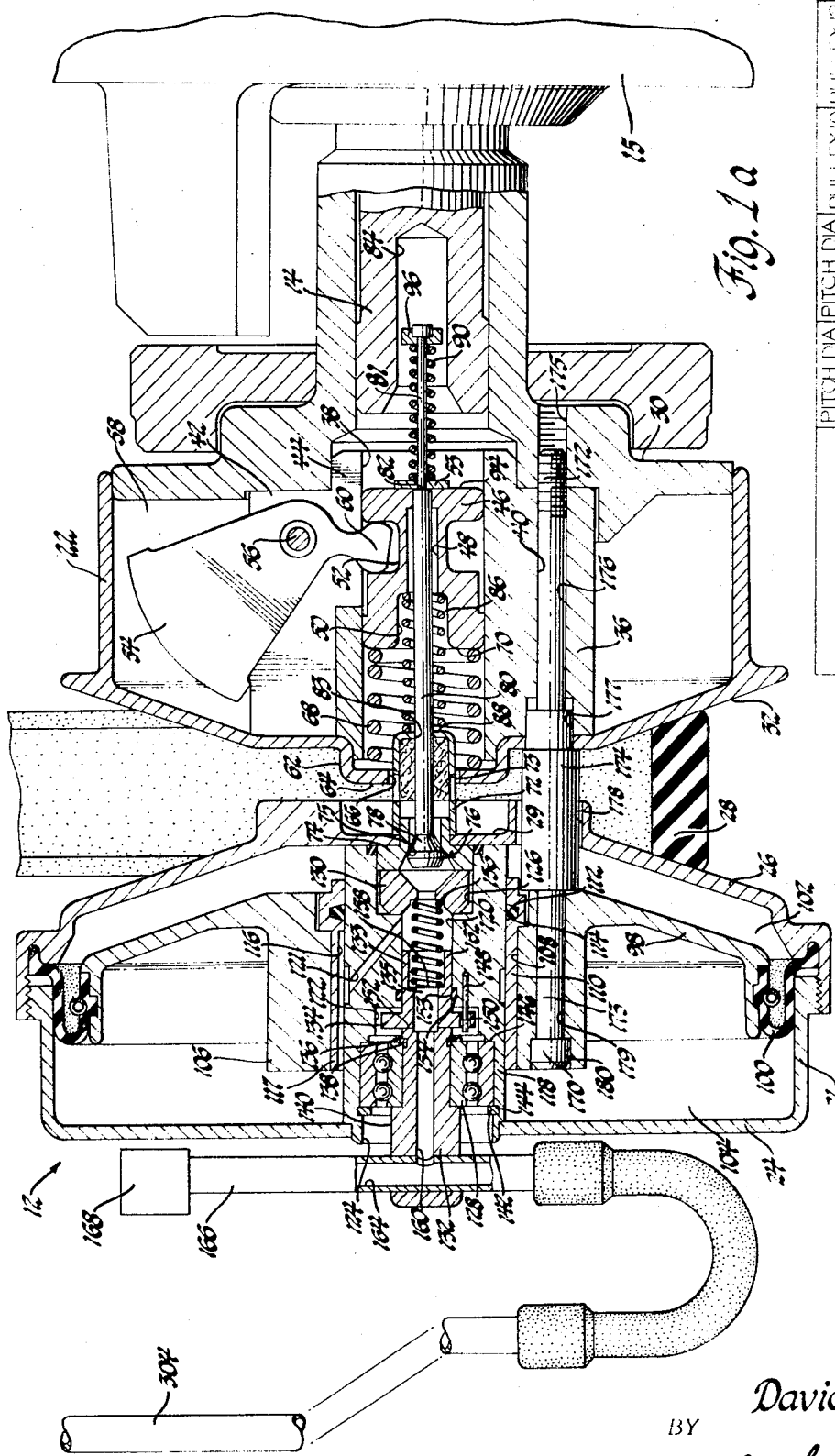

United States Patent

Betz

[15] 3,653,283
[45] Apr. 4, 1972

[54] ACCESSORY DRIVE MECHANISM
[72] Inventor: David W. Betz, Dayton, Ohio
[73] Assignee: General Motors Corporation, Detroit, Mich.
[22] Filed: June 8, 1970
[21] Appl. No.: 44,155

[52] U.S. Cl.....................74/864, 74/230.17 F, 74/230.17 M
[51] Int. Cl.........................................B60k 21/10, F16h 9/18
[58] Field of Search...........74/863, 864, 230.17 E, 230.17 F, 74/230.17 M

[56] References Cited

UNITED STATES PATENTS

| | | | |
|---|---|---|---|
| 2,909,071 | 10/1959 | Smyth et al.......................74/230.17 E |
| 2,916,024 | 12/1959 | Dodge..............................74/230.17 E |
| 2,260,798 | 10/1941 | Burns........................74/230.17 F X |
| 2,521,457 | 9/1950 | Heyer..............................74/230.17 E |
| 2,755,683 | 7/1956 | Ryan..........................................74/863 |
| 3,088,327 | 5/1963 | Swigart............................74/230.17 F |
| 3,157,066 | 11/1964 | Donley et al.................74/230.17 F X |
| 3,269,207 | 8/1966 | Borsattino................................74/864 |
| 3,557,640 | 1/1971 | Hendriks et al..............74/230.17 F X |

Primary Examiner—Carlton R. Croyle
Assistant Examiner—Thomas C. Perry
Attorney—Warren E. Finken, A. M. Heiter and John P. Moran

[57] ABSTRACT

An engine accessory drive mechanism wherein a first pulley portion is driven by the crankshaft and a second pulley portion is mounted on the water pump shaft and driven by a belt interconnecting the two pulleys. The second pulley portion includes provisions formed thereon for mounting additional belts to drive the other engine accessories. Each pulley portion includes one wall which is movable in response to changes in engine vacuum, with the influence of the engine vacuum on the movable walls being modified by the action of centrifugal force, the flyweight mechanism therefor being mounted on the first pulley portion, and the overall result being that the interconnecting belt is moved alternately in and out of the variable pulley grooves, changing the respective pitch diameters as required to drive all the accessories at a substantially constant speed throughout the full range of engine speeds.

5 Claims, 3 Drawing Figures

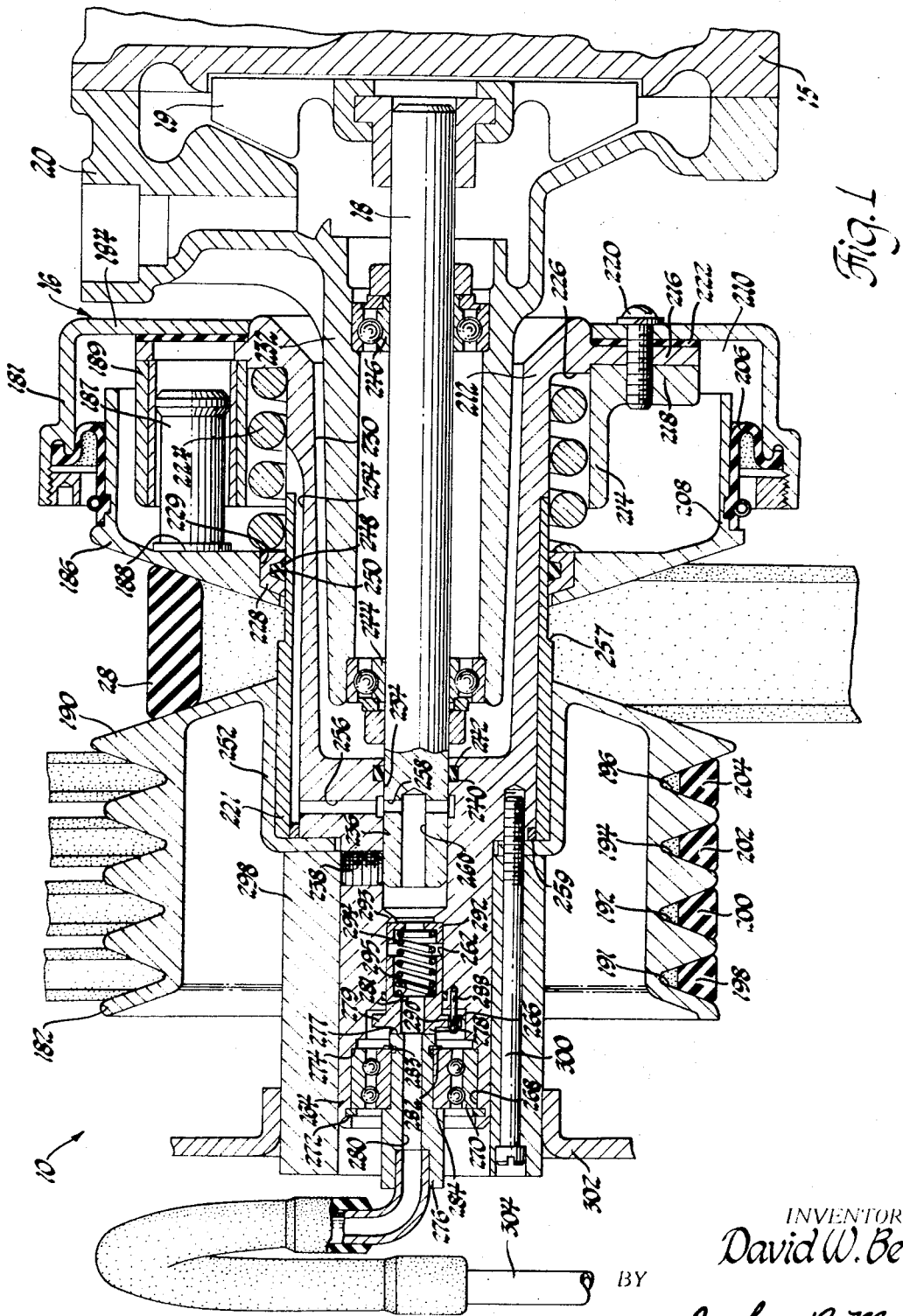

| ENGINE CONDITION | PITCH DIA. IN PULLEY 10 | PITCH DIA. IN PULLEY 12 | PULLEY 10 RPM | PULLEY 12 RPM |
|---|---|---|---|---|
| OFF WITH NO VACUUM | 5-1/8 | 3-7/8 | — | — |
| BELOW 1700 RPM | 3-3/8 | 6-1/4 | 1850 | 1000 |
| 1950 RPM | 4-15/16 | 4-15/16 | 1950 | 1950 |
| ABOVE 3000 RPM | 3-7/8 | 3-7/8 | 1980 | 3000 |

INVENTOR.
David W. Betz
BY
John P. Moran
ATTORNEY

ACCESSORY DRIVE MECHANISM

This invention relates to accessory drives and more particularly to a belt drive for driving the accessories of a vehicle engine at a substantially constant speed irrespective of variations in engine speed.

In the operation of internal combustion engines in automotive applications, it is desirable that the accessories, such as cooling fans, generators, power steering pumps and air conditioning compressors, for example, be driven at a substantially constant speed for most efficient operation of the accessory itself and also to reduce power consumption and noise by preventing the accessories from being driven at excess speed.

Accordingly, an object of the invention is to provide an improved accessory drive unit for driving the accessories of a vehicle engine at a substantially constant speed.

Another object of the invention is to provide an improved accessory drive mechanism wherein a first pulley assembly is driven by the engine crankshaft, while a second pulley assembly is mounted on the water pump shaft, including provisions for driving the cooling fan and the water pump impeller directly, and the other accessories through a plurality of belts, in response to rotation of the second pulley assembly by an interconnecting belt driven by the first pulley assembly; and including means for varying the pitch diameters of both pulley assemblies, as required to drive the accessories within a predetermined relatively narrow speed range.

A further object of the invention is to provide such an improved accessory drive mechanism wherein the means for varying the pulley pitch diameters is responsive to engine vacuum, the effect of the latter being modified by the action of centrifugal force.

A still further object of the invention is to provide an improved accessory drive mechanism wherein one belt supporting wall of each of two pulley assemblies is axially movable in response to changes in engine manifold vacuum, with said walls being further influenced by the admission of ambient air by valve means responsive to the action of centrifugal force representative of engine speed.

Still another object of the invention is to provide an engine accessory drive mechanism wherein one pulley assembly is driven by the crankshaft and includes first and second housings whose adjacent walls serve as a V-groove for a belt, and a second pulley assembly is mounted on the water pump housing and includes third and fourth housings whose adjacent walls serve as a second V-groove for such belt, the first and third housings including vacuum-responsive means for axially moving their respective walls of the two V-grooves, the second housing including flyweights for varying the opening of a valve to admit ambient air into the first housing and into a passage interconnecting the first and fourth housings, and the fourth housing having a plurality of grooves formed thereon for driving additional belts connected to various engine accessories.

These and other objects and advantages will be apparent when reference is made to the following description and accompanying drawings, wherein:

FIGS. 1 and 1a are cross-sectional views of an accessory drive system embodying the invention; and FIG. 2 is a table of operating characteristics.

Referring now to the drawings in greater detail, FIGS. 1 and 1a illustrate an accessory drive system 10 having a lower pulley portion 12 which is mounted for rotation on an engine crankshaft 14 extending from a conventional engine 15, and an upper pulley portion 16 mounted for rotation on a water pump shaft 18 extending from the pump impeller 19 of a water pump 20. The lower pulley portion 12 includes a pair of housing members 21 and 22. The housing member 21 includes a rear wall 24 and a forward wall 26, the forward wall 26 forming a sloped pulley side wall for a supporting belt 28 and having a central hub portion 29. The housing member 22 includes a rear wall 30 and a forward wall 32, the forward wall 32 forming the other sloped pulley side wall for the belt 28. The rear wall 30 includes an axial tubular extension 34 which is mounted on the crankshaft 14.

A spacer member 36 is mounted concentrically within the housing 22 and between the end walls 30 and 32. An axial opening 38 is formed through the spacer member 36. A passage 40 is formed longitudinally through the body of the spacer member 36 parallel to the axial opening 38. A longitudinal slot 42 is formed through the body of the spacer member 36 diametrically opposite the longitudinal passage 40. A longitudinal opening 44 is formed through an end portion of the spacer member 36 providing access between the longitudinal slot 42 and the axial opening 38. A member 46 is slidably mounted in the axial opening 38 adjacent the longitudinal opening 44. The member 46 includes an axial passage 48, a counterbored opening 50 formed in one end thereof, and an annular groove 52 formed around the outer periphery and intermediate the ends thereof. An abutment or ring member 53 is secured to the member 46 on the end face opposite the counter bore 50.

A plurality of equally spaced flyweights 54 are pivotally mounted on pins 56 mounted in the body of the spacer member 36 transversely through the longitudinal slot 42. Each flyweight 54 is free to pivot about its respective pin 56 in a chamber 58 formed within the housing 22, as will be described. A tab 60 is formed on each flyweight 54 and extends through the longitudinal opening 44 into the annular groove 52 of the member 46.

A central cylindrical protrusion 62 is formed on the sloped pulley wall 32 and includes an internal flange portion 64 having an axial opening 66 formed therethrough. A coil spring 68 is mounted in the axial opening 38 between the internal flange 64 and the end face 70 of the member 46 adjacent the counter bored opening 50. A cup-shaped member 72, including radial perforations 73, extends from the center of the sloped pulley wall 26 toward and through the axial opening 66, into the larger axial opening 38 such that the entering end thereof is surrounded by a portion of the coil spring 68. A flanged sleeve member 74 is mounted in the fully open end of the member 72 and includes a central valve seat 75.

A valve member 76 includes a head portion 78 for valving cooperation with the seat 75 and a stem including larger and smaller diameter portions 80 and 81 with a shoulder 82 formed therebetween, the stem extending through the flanged sleeve member 74, through the length of the cup-shaped member 72 and an opening 83 formed in the end thereof and thence through the concentric openings 38 and 48 and the abutment or ring member 53, into a counterbored opening 84 formed in the end of the crankshaft 14. A smaller coil spring 86 is mounted concentrically within the larger coil spring 68 around the larger diameter stem portion 80 and between the internally flanged end 88 of the cup-shaped member 72 and the bottom of the counterbore 50. Another coil spring 90 is mounted around the smaller diameter extended end 81 of the valve stem, between the abutment 53 secured to the end 94 of the member 46 and a spring retainer 96 formed adjacent the end of the small stem portion 81 within the counterbore 84 of the crankshaft 14.

A fixed sloped wall member 98 is mounted within the housing 21, the slope thereof being parallel with that of the wall 26. A diaphragm 100 is secured between the outer peripheral edge of the wall 98 and the inner peripheral surface of the housing member 21, providing for relative movement between the housing member 21 and the included fixed wall 98 and forming chambers 102 and 104 on the opposing sides thereof with the end walls 26 and 24, respectively.

A central hub portion 106 is formed on the wall 98 extending toward the rear wall 24 of the housing member 21 and having an axial opening 108 formed therethrough. A sleeve member 110 is secured within the axial opening 108, a seal 112 being mounted in a groove 114 formed around the inner periphery thereof. Slots 116 are formed longitudinally along the inner surface of the sleeve member 110, opening one end 117 to the chamber 104.

A cylindrical member 118 is slidably mounted through the sleeve member 110 between the walls 24 and 26 of the housing member 21. An axial opening 120 is formed in the central member 118, and a tapered opening 121 is formed in the member 118 to communicate between the opening 120 and the slots 116. The axial opening 120 includes first and second counterbores 122 and 124, respectively, formed in one end thereof, and a third counterbore 126 formed in the other end thereof. A bearing 128 is mounted in the counterbore 124, and a spring retainer member 130 is mounted in the counterbore 126 adjacent the valve seat member 74. A fixed connector member 132 extends through the bearing 128 into the counterbore 122, abutting against the end face of a sleeve member 133 having an external flange 134 positioned in the counterbore 122 and including an axial passage 135. The bearing 128 is confined between a retaining ring 136 mounted in a groove 138 formed on the outer periphery of the connector member 132 and a shoulder 140 formed thereon, and between a retaining member 142 mounted in a groove 144 formed on the inner surface of the central cylindrical member 118 and an abutment 146 formed by the juncture between the counterbores 122 and 124.

A pin 148 extends from the body of the central member 118 into the counterbore 122 and through an opening 150 formed in the external flange 134 of the sleeve member 133, causing the latter to rotate with the member 118 against the adjacent end 152 of the connector member 132. An O-ring seal 153 is mounted in an annular groove 154 formed around the inner surface of the central member 118 and around the outer surface of the sleeve member 133. A spring 156 is mounted between the spring retainer member 130 and a shoulder 158 formed in the member 133. An axial opening 160 is formed partially through the connector member 132 from the innermost end 152 thereof. A transverse opening 164 is formed through the connector member 132 adjacent the outermost end of the axial passage 160, such that communication is provided between the passage 160 and the opening 164. A tube or conduit 166 communicates between the transverse passage 164 and a source of engine vacuum, represented generally by 168.

A plurality of stud members 170, each of which may include a small diameter threaded end portion 172, a two-diameter head-end portion 173 and a larger two-diameter intermediate portion 174, are each mounted in aligned openings 175, 176, 177, 178, 179 and 180 formed in the rear wall 30, sleeve member 36, the oppositely disposed pulley walls 32 and 26, and the hub member 106. This permits the pulley wall 26 of the housing 21 to slide on the larger stem portion 174 toward and away from the adjacent pulley wall 32 of the housing 22, while causing the housing 21 to rotate with the housing 22.

The upper pulley portion 16 includes axially aligned housings 181 and 182. The housing 181 includes a rear wall 184 and a forward sloped wall 186, the latter serving as one side of an upper pulley groove for the belt 28. A plurality of pin members 187 are secured to an inner flat surface portion 188 of the sloped wall 186 and each is slidably mounted in a sleeve member 189, the latter being connected for rotation with the rear wall 184, thereby permitting rotation together and relative axial movement of the walls 184 and 186 of the housing 181.

The belt 28 is mounted between the pulley wall 186 and an adjacent sloped forward wall 190 of the housing 182, the rear or left end of the housing 182 being open. A plurality of annular V-shaped grooves 191, 192, 194 and 196 are formed around the outer periphery of the housing 182, suitable for having mounted therein a plurality of V-belts 198, 200, 202 and 204, respectively, the latter belts being suitable for driving engine accessories (not shown), such as a power steering pump, the air conditioner compressor and the alternator, for example.

A diaphragm 206 is mounted between the inner surface of the housing 181 and a cylindrical member 208 extending from the outer edge of the forward sloped wall 186 extending toward the rear wall 184. The diaphragm 206 serves as a means for varying the size of a chamber 210 formed within the housing 181.

A pair of concentric sleeve members 212 and 214, including respective flanges 216 and 218, are secured to the rear wall 184 by any suitable means, such as bolts 220. An additional sleeve member 221 is mounted on the member 212 adjacent the end opposite the flange 216. A gasket 222 may be mounted between the flange 216 and the inner surface of the rear wall 184. A coil spring 224 is mounted radially between the outer surface of the sleeve member 212 and the inner surface of the sleeve member 214 and longitudinally between an inner surface 226 of the flange 216 and a spring and seal retainer 228 mounted in a counterbored opening 229 formed in the inner surface 188 of the forward sloped wall 186. The sleeve member 212 has a large diameter opening 230 formed therein freely positioned around a fixed cylindrical extension 232 extending from the water pump housing 20, and a smaller diameter internal opening 234 for mounting on the extended end 236 of the water pump shaft 18 and secured thereto by any suitable means, such as a setscrew 238. An O-ring seal 240 is mounted between the shaft 18 and the small diameter portion 234 of the sleeve member 212 in a groove 242. A pair of bearings 244 and 246 are mounted between the shaft 18 and spaced inner portions of the water pump housing extension 232. A seal member 248 is mounted around the outer periphery of the sleeve member 221 in an annular groove 250 formed in the spring and seal retainer 228. A shoulder 257 is formed on the sleeve 221 to serve as a stop for the movable pulley wall 186.

The sleeve member 212 extends into a central hub portion 252 which is formed on the inner surface of the tapered pulley wall 190, and is secured therein in any suitable manner, such as by press-fit. A plurality of slotted passages 254 and 256 are formed on the outer surface of the sleeve member 212 adjacent the inner surface of the sleeve member 221, communicating between the chamber 210 in the housing 181 and a transverse passage 258 formed adjacent the extended end 236 of the water pump shaft 18. A ring member 259 serves to close off the ends of the passages 254. The transverse passage 258 communicates with an axial opening 260 formed in the extended end 236 of the shaft 18. The opening 260 communicates with a central axial passage axial passage 262 of the end portion 264 of the sleeve member 212, the end portion 264 extending completely through the housing 182. Counterbores 266 and 268 are formed in the extended end portion 264 of the sleeve member 212. A bearing 270, is mounted in the counterbore 268 and confined axially therein by a retainer ring 272 mounted in the counterbore 268 and a shoulder 274 formed by the juncture between the counterbores 266 and 268. A connector member 276 is mounted through the bearing 270, extending into the counterbore 266 and having its innermost end 277 abutting against a sleeve member 278. The latter is mounted in the central axial passage 262 of the end portion 264 and includes an external flange 279 positioned in the counterbore 266. Aligned axial passages 280 and 281 are formed through the respective connector and sleeve members 276 and 278 for communication with the axial opening 260 in the extended end 236 of the shaft 18.

The bearing 270 is retained axially on the connector member 276 between a retainer ring 282 mounted in a groove 283 formed on the member 276 and a shoulder 284 formed thereon. A pin member 288 extends from the bottom of the counterbore 266 into a notch 290 formed in the flange 279 of the sleeve member 278, causing the latter to rotate with the sleeve member 212 against the end 277 of the fixed connector member 276. A spring retainer 292 is mounted in axial passage 262 against a shoulder 293 formed in the sleeve member 212. A spring 294 is mounted between a shoulder 295 formed in the sleeve member 278 and the retainer 292. A sleeve member 298 is mounted on the outer surface of the extended end portion 264 of the sleeve member 212 and is secured thereto by any suitable means, such as one or more bolts 300. A conventional cooling fan 302 is secured to the sleeve member 298 for rotation therewith.

A tubular conduit or passage 304 communicates between the axial opening 280 of the connector member 276 of the upper pulley housing portion 182 and the transverse opening 164 of the connector member 132 of the lower pulley housing portion 21.

It may be noted that the connector member 276 of the upper pulley assembly 10 and the connector member 132 of the lower pulley assembly 12 between which the tubular passage 304 is connected remain stationary while the respective surrounding housings 182 and 21 rotate on the respective bearings 270 and 128.

Operation

We will now consider various engine operating conditions. Assume first an ENGINE-OFF/NO-VACUUM condition. Under this condition, both the lower variable chamber 104 and the upper variable chamber 210 will be exposed to atmospheric pressure by virtue of there being no engine vacuum available from the vacuum source 168. Since there is no centrifugal force at this time, the flyweights 54 would be pivoted downwardly about the pins 56 into the longitudinal slot 42, causing the valve head 78 to be closed tightly against the seat 75 by virtue of the force of the spring 68 moving the member 46 to the right in FIG. 1a.

Inasmuch as the chamber 104 of the lower pulley housing 21 is exposed to atmospheric pressure, as is the adjacent chamber 102, the housing member 21 will be urged to the left in FIG. 1a by the force of the belt 28 on the forward sloped pulley wall 26, until the inner surface of the pulley wall 26 contacts the fixed sloped wall 98. At the same time, due to both sides of the upper pulley wall 186 of the housing 181 being subjected to atmospheric pressure, the spring 224, whose ring end (FIG. 1) is abutted against the fixed surface 226, will urge the pulley wall 186 to the left. As a result of the above-described positions of the movable pulley walls 26 and 186, the belt 28 will be located in the outermost portion of the upper pulley groove formed by the sloped walls 186 and 190, and in an innermost position in the lower pulley groove formed by the walls 26 and 32. The respective pitch diameters at this time are substantially 5⅞ inches and 3⅞ inches (FIG. 2).

Considering now an IDLE and/or BELOW 1,000 r.p.m. condition, the lower chamber 104 and the upper chamber 210 will be subjected to the highest engine manifold vacuum, such vacuum having entered the chamber 104 from the source 168 via the passages 166, 164, 160, 120, 121, 116, and having entered chamber 210 via the passages 166, 164, 304, 280, 281, 262, 260, 258, 256 and 254. This will permit atmospheric pressure outside the rear wall 24 of the movable housing 21 to move the housing 21 to the right in FIG. 1a, causing the forward sloped pulley wall 26 to slide on the cylindrical member 118 and push the belt 28 outwardly in the progressively narrowing groove 26/32. At the same time, atmospheric pressure on the forward sloped pulley wall 186 of the housing 181 will move the latter to the right in FIG. 1, against the force of the spring 224, and thereby expand the pulley groove 186/190 allowing the outwardly moving lower portion of the belt 28 to pull the upper portion thereof inwardly, reaching the lower and upper diameters of 6¼inches and 3 ⅜inches, respectively, the resulting corresponding lower and upper pulley r.p.m.'s being substantially 1,000 and 1,850, respectively, (FIG. 2).

At the 1,000 r.p.m. condition, the flyweights 54 will still be at their substantially innermost positions, thus maintaining the member 46 in the same position. However, the valve seat member 74 will move to the right in FIG. 1a along with the pulley wall 26. While this is happening, the spring 90 will urge the retainer 96 and hence the valve stem portions 80 and 81 and the valve head 78 to the right, maintaining the head 78 of the valve 76 against the seat 75, with the shoulder 82 formed between the stem portions 80 and 81 approaching the inner surface of the abutment member 53 in the axial opening 48 of the member 46.

Assume now a predetermined intermediate engine condition, such as 1,950 r.p.m. The flyweights 54 will have pivoted outwardly about the pins 56 under the action of centrifugal force, thus pivoting the tabs 60 in a clockwise direction, thereby sliding the member 46 to the left in FIG. 1a, against the force of the spring 68. The attached abutment 53 will contact the shoulder 82 and move the stem 80, 81 and the valve head 78 to the left, the latter moving away from the seat 75. This will permit air at atmospheric pressure to enter the perforations 73 in the cup-shaped member 72 and flow through the opening between the valve head 78 and the seat 75 and thence through the passages 120, 121 and 116 to the lower variable chamber 104. Additionally, the upper variable chamber 210 will be subjected to a progressively decreasing engine vacuum by virtue of the entering air being communicated thereto via the axial passages 120, 135 and 160 and, thence, via the passages described above relative to the communication of engine vacuum. This will result in the walls 24 and 26 of the housing member 21 moving to the left, while the upper spring 224 moves the forward sloped pulley wall 186 of the housing 181 also to the left. Hence, the upper portion of the belt 28 will be urged outwardly in the pulley groove 186/190, which movement will correspondingly pull the lower portion of the belt 28 radially inwardly in the pulley groove 26/32. The resultant upper and lower pitch diameters and speeds are substantially the same at 4 15/16 inches and 1,950 r.p.m., respectively (FIG. 2).

Next, considering an ABOVE 3,000 r.p.m. condition, the flyweights 54 will have continued to pivot outwardly until they have contacted the inner surface of the rear wall 30 of the housing 22. This will maintain the valve head 78 away from the seat 75 allowing ambient air to be communicated to the lower drive chamber 104 and the upper driven chamber 210. The resultant decreased vacuum in the upper chamber 210 assists the force of the spring 224 in moving the adjacent pulley wall 186 to the left in FIG. 1, thereby narrowing the width of the groove 186/190. This, of course urges the upper portion of the belt 28 outwardly, pulling the lower portion of the belt 28 inwardly into the now wider groove 26/32 (FIG. 1a), causing the lower forward movable pulley wall 26 of the housing member 21 to move further to the left into contact with the fixed inner wall 98 and resulting in respective upper and lower pitch diameters and speeds of substantially 5 ⅞inches and 1,980 r.p.m. and 3 ⅞inches and 3,000 r.p.m., respectively (FIG. 2).

It may be noted and should now be apparent that throughout the above cycle, the range of the upper pulley r.p.m. is relatively narrow, namely, 1,850—1,980, thereby rotating the fan 302 mounted on the interconnected sleeve member 298, the water pump impeller 19 mounted on the shaft 18, and the various engine accessories driven by the belts 198, 200, 202 and 204 at a substantially constant speed, regardless of the varying speed of the engine.

It should also be apparent that should a hose sustain a leak or a break at any time throughout the above cycle, the resultant influx of ambient air into the chambers 104 and 210 would cause the pulley walls 26 and 286, respectively, to be moved to the left, resulting in a low ratio of pulley 12 to pulley 10 pitch diameters, thus assuring the prevention of any overspeeding while causing some loss in output.

While but one embodiment of the invention has been shown and described, other modifications thereof are possible.

I claim:

1. A drive mechanism for use with a vehicle engine for driving a plurality of engine accessories at a substantially constant speed, said drive mechanism comprising first, second, third and fourth pulley walls, a source of engine vacuum, means operatively connected between said source and said first and third pulley walls for axially moving said first and third walls in opposite directions with respect to one another in response to changes in engine vacuum, centrifugal weight means for modifying said changing engine vacuum influencing the movement of said first and third pulley walls with atmospheric air at ambient pressure in response to the action of centrifugal force reflective of engine speed, said second and fourth pulley walls being axially fixed, said first and second pulley walls forming a first variableswidth pulley groove and said third and fourth pulley walls forming a second variable-width pulley groove, said first and second pulley walls being rotatable by said engine, the pitch diameter of said first variable-width pulley groove progressively decreasing with increasing engine speed by virtue of said axial movement of said first wall, and the pitch diameter of said second variable-width pulley groove progressively increasing with increasing engine speed by virtue of said axial movement of said third wall to thereby maintain the speed of said third and fourth pulley walls substantially constant with varying engine speed, a cooling fan and water pump impeller speed, mounted for rotation with said third and fourth pulley walls, and a plurality of grooves formed adjacent said fourth pulley wall for rotation therewith, said grooves being suitable for having a plurality of belts mounted therein for driving other engine accessories.

2. A drive mechanism for driving a plurality of engine accessories at a substantially constant speed, said drive mechanism comprising a first pulley having one axially movable wall, a second pulley having one axially movable wall, a source of engine vacuum, a first chamber adjacent said movable wall of said first pulley, first passage means for communicating the engine vacuum from said source to said first chamber, a second chamber operatively connected to said movable wall of said second pulley, second passage means for communicating said engine vacuum from said source to said second chamber, an endless belt connected between said first and second pulleys, valve means responsive to centrifugal force for permitting air at ambient pressure to enter said first and second chambers to mix with said engine vacuum therein, a cooling fan mounted for rotation with said first pulley, and a plurality of annular grooves formed on said fixed wall of said first pulley, each of said plurality of grooves being suitable for driving a belt operatively connected to any of said engine accessories.

3. A drive mechanism for driving a plurality of internal combustion engine accessories at a substantially constant speed, said drive mechanism comprising a first pulley assembly having one axially movable wall portion, a second pulley assembly having one axially movable wall portion, a source of engine vacuum, a first chamber adjacent said movable wall of said first pulley, first passage means for communicating the engine vacuum from said source to said first chamber, a second chamber operatively connected to said movable wall of said second pulley, second passage means for communicating said engine vacuum from said source to said second chamber, an endless belt mounted on said first and second pulleys, said first pulley varying in width in one direction and said second pulley varying in width in the opposite direction in response to changes in said engine vacuum for causing said endless belt to move radially in said pulleys to attain respective pitch diameters as required to drive said first pulley at a substantially constant speed, and means operatively connected to said first and second chambers for modifying said engine vacuum therein with ambient pressure in response to changes in engine speed.

4. The drive mechanism described in claim 3, wherein said last-mentioned means includes third passage means for communicating air surrounding said first and second pulley assemblies to said first and second chambers, valve means operatively connected in said third passage means, and flyweights responsive to engine speed for varying the opening past said valve means, thereby controlling the flow of ambient air therepast.

5. A drive mechanism for use with a vehicle engine for driving a plurality of engine accessories at a substantially constant speed, said drive mechanism comprising a first pulley assembly including first and second housings, said housings having adjacent walls forming a first V-groove; a second pulley assembly rotatable by said engine and including third and fourth housings, said housings having adjacent walls forming a second V-groove, portions of said first and third housings being axially movable so as to vary the widths of said first and second V-grooves; a source of engine vacuum; a first chamber adjacent said movable wall of said first housing; first passage means for communicating the engine vacuum from said source to said first chamber; spring means in said first chamber for at times urging the movable wall of said first housing toward said adjacent wall of said second chamber forming said first V-groove; a second chamber formed in said third housing; second passage means for communicating said engine vacuum from said source to said second chamber; an endless belt mounted in said first and second V-gooves; a centrifugally actuated valve operatively connected to said third and fourth housings for subjecting said first and second chambers to ambient pressure in response to engine speed; a cooling fan and a water pump mounted for rotation with said first and second housings; and a plurality of annular grooves formed on said second housing, each of said plurality of grooves being suitable for driving a belt operatively connected to some one of said engine accessories.

* * * * *